June 30, 1931.                H. J. MURPHY                1,811,958
                            LUBRICATING SYSTEM
                          Filed Aug. 25, 1925              3 Sheets-Sheet 1
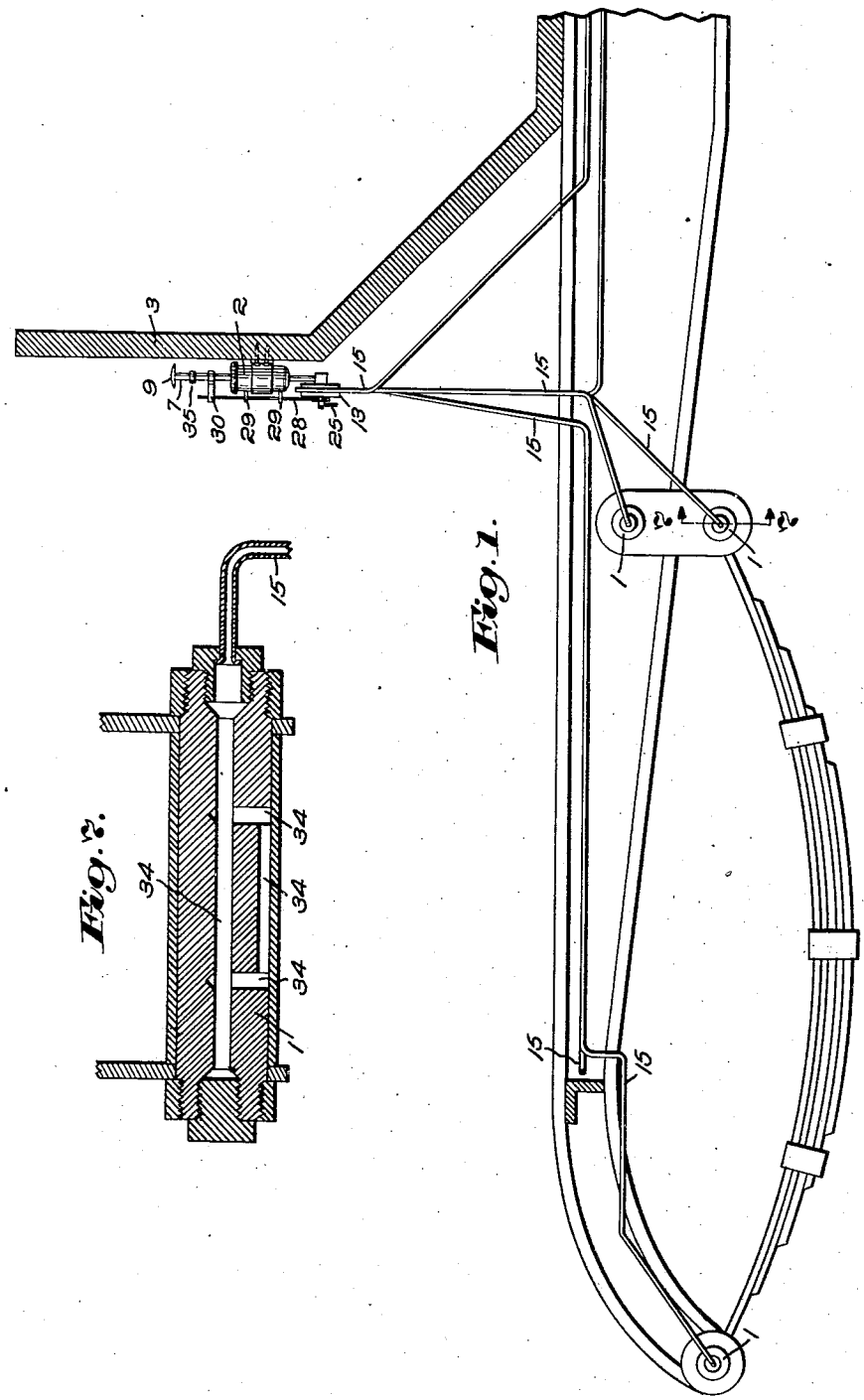

June 30, 1931.  H. J. MURPHY  1,811,958
LUBRICATING SYSTEM
Filed Aug. 25, 1925    3 Sheets-Sheet 2
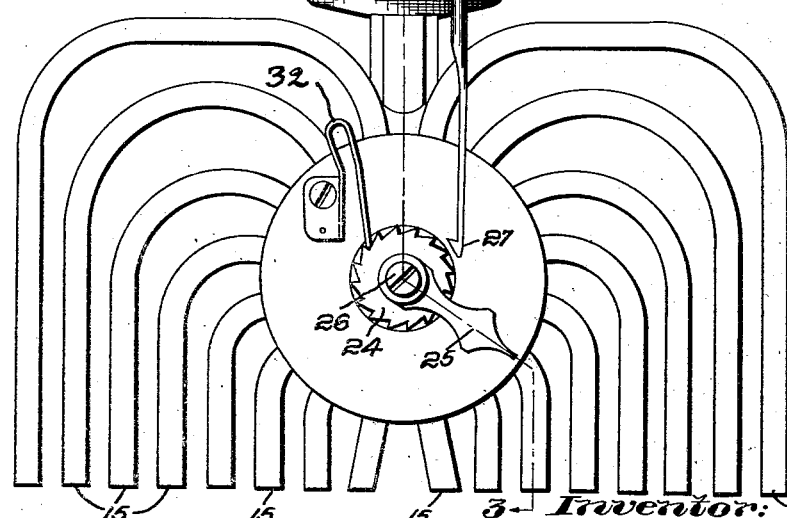

June 30, 1931.  H. J. MURPHY  1,811,958
LUBRICATING SYSTEM
Filed Aug. 25, 1925   3 Sheets-Sheet 3
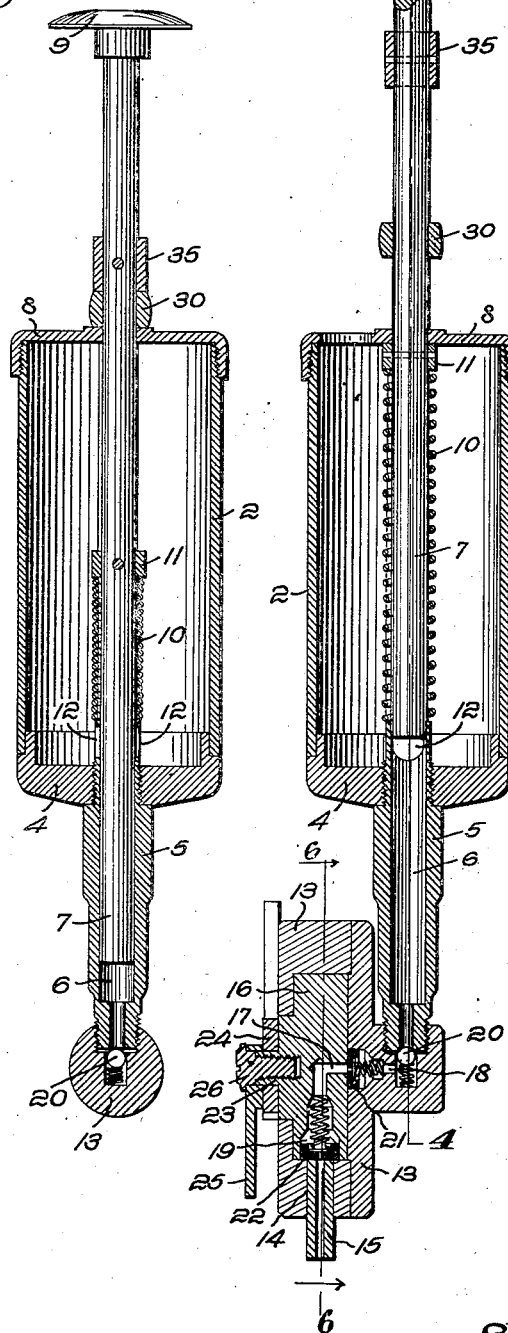
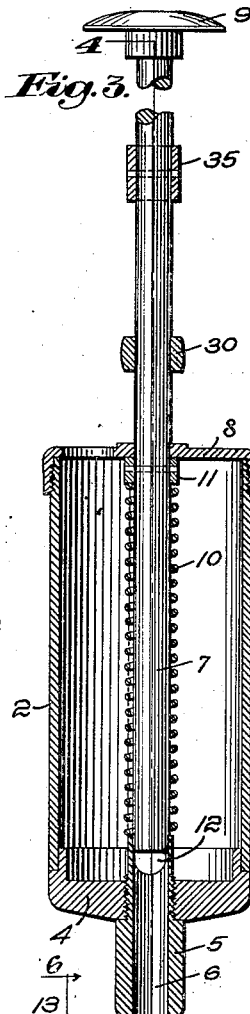
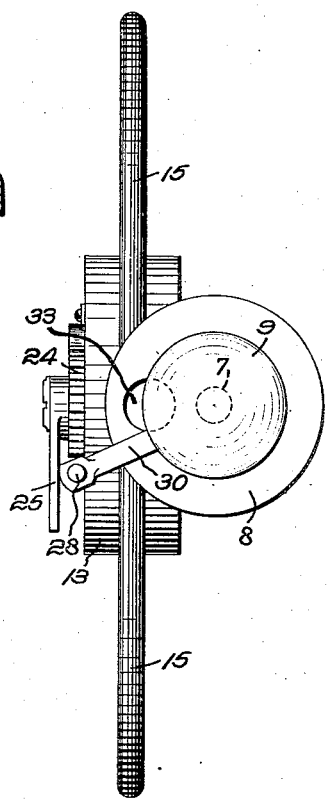
Inventor:
Howard J. Murphy, Patented June 30, 1931

1,811,958

UNITED STATES PATENT OFFICE

HOWARD J. MURPHY, OF READING, MASSACHUSETTS, ASSIGNOR, BY MESNE ASSIGNMENTS, TO ALEMITE CORPORATION, OF CHICAGO, ILLINOIS, A CORPORATION OF DELAWARE

LUBRICATING SYSTEM

Application filed August 25, 1925. Serial No. 52,404.

This invention aims to provide an improved lubricating system.

In the drawings which illustrate a preferred embodiment of my invention:—

Figure 1 is a sectional view of the front end of an automobile chassis showing the dash in cross-section and a portion of the lubricating system, the whole being more or less diagrammatic;

Fig. 2 is an elevation of the central lubricant expelling device, showing the valve which controls flow of lubricant to the pipes leading to the bearings and the mechanism for operating the valve;

Fig. 3 is a section through the device on the line 3—3 of Fig. 2;

Fig. 4 is a section on the line 4—4 of Fig. 3 showing the plunger in the discharge position;

Fig. 5 is a plan view of the parts of the device shown in Fig. 2;

Fig. 6 is a section through the valve on the line 6—6 of Fig. 3, and

Fig. 7 is a section through a portion of a spring shackel on the line 7—7 of Fig. 1.

Referring to the drawings, I have illustrated a lubricating system which provides for lubricating a number of bearings from a centrally located tank. The system is particularly, though not exclusively, useful for lubricating bearings of automobiles, as it is positive in operation, being constructed so that a predetermined quantity of lubricant is forced under a relatively high potential pressure to one bearing at a time. The device also operates so that a clogged bearing is brought to the attention of the operator during the operation of forcing lubricant to the bearings.

The particular system illustrated is shown in connection with the lubrication of bearings 1 of an automobile chassis as illustrated in Fig. 1. The source of lubricant may be a tank 2 secured in any suitable manner to the chassis at a convenient point. In the drawings, however, the tank 2 is shown secured to the dash 3 of the automobile underneath the hood (not shown).

The tank 2 is provided with a bottom head 4 into which is threaded an outlet pipe 5 having a chamber 6 therein of relatively small cross-sectional area into which is fitted a plunger rod 7 extending upwardly through the top head 8 of the tank and presenting a handle 9 for operation of the plunger in the chamber. A spring 10 is interposed between the upper end of the pipe 5 and a collar 11 secured to the plunger rod 7 to normally raise the plunger so that the lower end of the plunger uncovers a port or ports 12 at the upper end of the pipe 5 as shown in Fig. 3. A rotary valve casing 13 having a plurality of radial outlets 14 is secured to the lower end of the pipe 5, and tubes 15 are fitted into the outlets 14 and connect the casing to the various bearings 1 to be lubricated.

Within the casing 13 is arranged a rotary valve part 16, Figs. 3 and 6, having a central port 17 communicating with a passage 18 in the casing 13 which in turn communicates with the outlet end of the pipe 5. A single radial passage 19 extends from the central port 17 to the outer periphery of the rotary valve part for communication with the ends of the tubes 15. A spring pressed ball check 20 is located at the outlet end of the pipe 5 to prevent return of lubricant and spring pressed packings 21 and 22 are provided between the end of the passage 18 and port 17 and the radial passage 19 and the inner wall of the casing 13 to prevent leakage of lubricant between the casing and rotary valve at those points.

The rotary valve part 16 presents a hub portion 23 through the front of the casing 13 to which is secured a ratchet wheel 24 and an indicator pointer 25, Figs. 2 and 3, by a screw 26. The ratchet wheel 24 is operated by a pawl 27 formed on the lower end of a rod 28 supported and guided in bearings 29 secured to the tank 2. The upper end of the rod 28 extends beyond the upper end of the tank 2 and is secured to an arm 30 carried by and slidable upon the plunger rod 7. A spring 31 is interposed between the upper bearing 29 and the arm 30 to assist the spring 10, within the tank 2, and to turn the ratchet 24 during the return stroke of the plunger rod 7. A flat spring 32 is secured to the casing 13 and has its free end meshing with the teeth of the ratchet to prevent movement of the wheel in a clockwise direction.

An opening 33 is provided in the top 8 of the tank 2 to permit filling thereof with lubricant without removing any of the parts of the device, as best illustrated in Figs. 3 and 5.

A sleeve or collar 35 is secured to the plunger rod 7 adjacent to the upper end thereof to provide a stop for limiting the downward movement of the plunger. Thus the collars 11 and 35 provide stop means for limiting the movement of the plunger so that the same amount of lubricant may be forced from the chamber 6 at each downward stroke of the plunger.

In the normal position of the parts of the system, as illustrated in Fig. 3, the lubricant flows into the chamber 6 and is trapped therein by the ball check 20 until the plunger rod 7 is pushed downwardly to expel the lubricant from the chamber. As the plunger is pushed downwardly the lubricant is forced under relatively high pressure past the ball check 20, through the passages 18, 17 and 19 respectively to one of the bearings through a tube 15 communicating with the passage 19. During the downward stroke of the plunger rod 7 the pawl carrying rod 28 is carried downwardly and the pawl 27 engages a tooth on the ratchet wheel 24 so that when the springs 10 and 31 force the rods 7 and 28 respectively upwardly again the pawl may turn the ratchet wheel in a contraclockwise direction. Thus the rotary valve 16 may be turned in the casing 13 so that the passage 19 moves from the tube which received the charge of lubricant, on the downward movement of the plunger 7, into communication with the next tube as shown by movement of the pointer 25. It will be understood from the above described operation that each time the plunger rod is pushed downwardly it discharges a measured amount of lubricant from the chamber 6 to one bearing only. The remainder of the tubes 15 leading to the bearings are cut off from the source of lubricant supply while the above mentioned operation takes place. Each bearing receives a measured quantity of lubricant under high pressure thereby clearing the bearing of old lubricant, dust and dirt.

During the return stroke of the plunger 7 the check valve 20 closes to prevent the lubricant already discharged from being drawn back into the chamber by suction created in the chamber 6 by return of the plunger. Each tube retains a certain amount of lubricant which is gradually fed to the grooves 34 (Fig. 7) in the bearing thereby providing a constant feed of lubricant to the bearings so that it is only necessary to force lubricant to the bearing from the tank every certain number of miles which may be decided by actual test.

A clogged bearing will be quickly detected by failure to force lubricant from the high pressure chamber 6 when pressure is exerted upon the handle 9. As each tube may be lettered or numbered (Fig. 2) the indicator 25 shows which bearing is clogged. In the case of a clogged bearing it will be necessary for the operator to turn the indicator, by hand, to the next tube 15 so that the operation of the plunger may be continued for supplying lubricant to the remaining bearings.

If a bearing becomes dry while the other bearings are still well lubricated it is only necessary to turn the pointer 25 to the particular tube leading to the dry bearing and force lubricant to that bearing without forcing lubricant to the other bearings. Thus any number of the bearings may be supplied with lubricant without forcing lubricant to bearings which do not need to be lubricated at that time.

While I have shown and described a preferred embodiment of my invention it will be understood that changes involving omission, alteration, substitution and reversal of parts and even changes in the mode of operation may be made without departing from the scope of my invention which is best defined in the appending claims.

Claims:

1. A centralized lubricating system comprising a lubricant reservoir, a high pressure cylinder integral therewith, a thrust operated plunger extending through said reservoir and co-operating with said cylinder, a rotary valve communicating with said cylinder, conduits leading from said valve to the bearings to be lubricated, and means secured to and reciprocable with said plunger for rotating said valve.

2. A centralized lubricating system comprising a lubricant reservoir, a plunger in said reservoir for discharging a small quantity of lubricant therefrom at high pressure, a ratchet operated rotary valve mechanism for progressively placing a plurality of pipes one at a time in communication with said reservoir, and resilient means operable by said plunger upon the return stroke thereof for shifting said valve.

3. A lubricating system comprising, in combination, a lubricant supply tank, a plurality of bearings to be lubricated from said tank, a valve casing presenting a plurality of outlets, tubes connecting said outlets with said bearings, a valve in said casing presenting a passage for communication with any one of said outlets, a pipe permanently connecting said tank with the passage in said valve, a chamber of relatively small cross-sectional area presented by said pipe, a plunger operable in said chamber to force lubricant to one of said outlets, and means operated by said plunger for shifting said valve upon its return stroke.

4. A lubricating system comprising, in combination, a lubricant supply tank, a plurality of bearings to be lubricated from said tank, a valve casing presenting a plurality of outlets, tubes connecting said outlets with said bearings, a rotary valve in said casing presenting a passage for communication with one of said outlets, a chamber of relatively small cross-sectional area between said tank and said valve, said chamber being filled with lubricant from said tank, a push operated plunger located in said chamber for forcing the lubricant from said chamber to the bearing in communication with said valve, a check valve located adjacent to the outlet end of said chamber to prevent return of the lubricant during the return stroke of said plunger, a ratchet and pawl mechanism operable upon the return stroke of said plunger to turn said valve, and means for indicating which of said bearings is in communication with said chamber.

In testimony whereof, I have signed my name to this specification.

HOWARD J. MURPHY.